United States Patent
Nakagawa

(10) Patent No.: US 7,460,744 B2
(45) Date of Patent: Dec. 2, 2008

(54) RING TYPE OPTICAL TRANSMISSION SYSTEM AND OPTICAL APPARATUS CONNECTED TO SAME

(75) Inventor: Goji Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/060,464

(22) Filed: Feb. 18, 2005

(65) Prior Publication Data

US 2006/0115210 A1 Jun. 1, 2006

(30) Foreign Application Priority Data

Nov. 30, 2004 (JP) ............... 2004-346341

(51) Int. Cl.
*G02B 6/28* (2006.01)
*H04B 10/20* (2006.01)

(52) U.S. Cl. ............... 385/24; 398/59; 398/72

(58) Field of Classification Search ............... None
See application file for complete search history.

(56) References Cited

U.S. PATENT DOCUMENTS

| | | | |
|---|---|---|---|
| 5,576,875 A * | 11/1996 | Chawki et al. ............... | 398/72 |
| 5,612,805 A | 3/1997 | Fevrier et al. | |
| 6,348,984 B1 | 2/2002 | Mizrahi | |
| 6,426,815 B1 * | 7/2002 | Koehler ............... | 398/59 |
| 2003/0091274 A1 | 5/2003 | Vohra et al. | |
| 2004/0184809 A1 | 9/2004 | Miyata et al. | |
| 2004/0234194 A1 | 11/2004 | Pearsson ............... | 385/24 |

FOREIGN PATENT DOCUMENTS

| | | |
|---|---|---|
| EP | 1079248 A2 | 2/2001 |
| EP | 1079248 A3 | 5/2003 |
| JP | 2004-153307 | 5/2004 |
| JP | 2004-235741 | 8/2004 |

* cited by examiner

*Primary Examiner*—Sung H Pak
*Assistant Examiner*—Hoang Tran
(74) *Attorney, Agent, or Firm*—Hanify & King, P.C.

(57) ABSTRACT

In the ring type optical communication system of the present invention, in each OADM arranged on a ring network, an optical signal which has the same wavelength as the add wavelength assigned to a local node, of the optical signals of each wavelength contained in WDM light input from on the ring, is extracted from a drop port Pd without being terminated by a rejection/add filter, and input to an optical switch. In the optical switch, either one of the optical signal extracted from the rejection/add filter, or the add light added onto the ring from the local node, is selected, and the selected light is applied to the add port Pa of the rejection/add filter. As a result, communication between a central station and optional OADM nodes, and multicast communication over a plurality of ring networks can be realized by means of a simple node configuration.

14 Claims, 14 Drawing Sheets

DROP LIGHTS  ADD LIGHTS
($\lambda 1 - \lambda n$)  ($\lambda 1 - \lambda n$)

DROP LIGHTS    ADD LIGHTS

RING TYPE OPTICAL TRANSMISSION SYSTEM AND OPTICAL APPARATUS CONNECTED TO SAME

BACKGROUND OF THE INVENTION (1) Field of the Invention

The present invention relates to a ring type optical transmission system which transmits wavelength division multiplexed (WDM) light between a plurality of nodes connected in a ring, and in particular to a ring type optical transmission system comprising a plurality of optical add/drop multiplexing (OADM) nodes, and an optical device which connects thereto.

(2) Related Art

The explosive increase in the demand for data communication, particularly in the demand for internet traffic, has meant that greater capacity and longer distance transmission is required from the backbone network. Furthermore, the increasingly Wide variety of services available to users means that a network is required which realizes high reliability and flexibility and is also economical.

Optical communication networks in particular, because of their position at the core of the basic form of an information communications network, are required to provide higher speed services over wider areas, and development is proceeding towards an information society at a rapid rate. Furthermore, wavelength division multiplexing (WDM) technology is widely used as the core technology in optical transmission systems. WDM transmission is a method of simultaneously transmitting a plurality of optical signals with different wavelengths over a single optical fiber by multiplexing the signals.

In nodes where WDM transmission is performed, because a variety of processing is performed in optical path units of the optical wavelength region, control in the form of optical add/drop multiplexing (OADM) is performed in which optical signals with a specific wavelength are added or dropped, for example, without converting the optical signals to an electric signal.

FIG. 19 shows an example of the configuration of a typical ring type optical transmission system which includes OADM nodes.

In the system shown in FIG. 19, for example a plurality of OADM nodes N1 to N7 centered about a central station N0 are connected in a ring by a transmission path 100. Because the central station N0 exchanges data with each OADM node, then to enable communication with all of the OADM nodes N1 to N7, after the WDM light input from the transmission path 100 is demultiplexed into distinct wavelengths, the drop, add and through processing of optical signals of each wavelength is controlled, and the optical signals of each wavelength are multiplexed again and output to the transmission path 100. As shown in FIG. 20, for example, a different wavelength group G1 to G7 is preallocated to each OADM node N1 to N7 as the add wavelengths, and nodes which are to act as communication partners are set by selecting the drop wavelengths in the local node using a wavelength tunable filter or the like. Such a construction makes it simple to set up connection paths for example in units of hours or minutes, and consequently a network can be provided which is well suited to such services as time based path sharing (wavelength sharing) services. Furthermore, setting the same drop wavelength in each OADM node enables multicast communication in which a single transmission signal is received at a plurality of points, and broadcast communication in which a single transmission signal is received by all of the nodes. Consequently, a network can be provided which is suited to image distribution and broadcasting type services which are anticipated to grow in the future.

A known example of a specific construction which realizes the function of the central station, uses a hub node as shown for example in FIG. 21. In the configuration example of FIG. 21, WDM light input from the transmission path is input into an optical demultiplexer 101 via an optical amplifier or the like, and demultiplexed into distinct wavelengths in the optical demultiplexer 101, after which signal light of each wavelength $\lambda 1$ to $\lambda n$ is output from each port of the optical demultiplexer 101. The signal light of each wavelength $\lambda 1$ to $\lambda n$ is branched into through light and drop light in an optical coupler (CPL) 102 corresponding to each wavelength. The through light of each wavelength $\lambda 1$ to $\lambda n$ is sent to an optical switch (SW) 103 corresponding to each of the wavelengths $\lambda 1$ to $\lambda n$, and either through light or add light is selected in each optical switch 103. The optical signals corresponding to the wavelengths $\lambda 1$ to $\lambda n$ output from each optical switch 103 are then multiplexed again in an optical multiplexer 104, and the WDM light is output to the transmission path via an optical amplifier or the like.

The hub node in the present specification signifies a node which demultiplexes the input WDM light into individual wavelengths and performs corresponding optical signal processing on each wavelength. In the configuration example in FIG. 21, by providing optical couplers 102 and optical switches 103 to correspond with each branched wavelength, the hub node is given the function of an OADM, and acts as a central station. In addition to the example above, known constructions for such hub nodes which function as an OADM include a construction where the OADM function is realized by providing for example 2×2 optical add/drop switches to correspond with each wavelength (see for example Japanese Unexamined Patent Publication No. 2004-153307).

Furthermore, to realize an OADM node as described above, a wavelength tunable optical filter is required which is capable of selecting an optical signal with the desired wavelength from within the WDM light. An acousto-optic tunable filter (AOTF) is an example of a widely used wavelength tunable optical filter. An AOTF filters the desired wavelength by inducing changes in the refractive index of an optical waveguide using the acousto-optic effect (an effect whereby light is diffracted by acoustic waves excited in a substance or on the surface of a substance), and isolating/selecting a spectral component by rotating the polarization state of light which propagates through the optical waveguide. Because this AOTF can adjust the optical wavelength for selection over a wide range by changing the value of the frequency of a radio frequency (RF) signal applied to an electrode for exciting acoustic waves formed on the optical waveguide substrate, the AOTF is a useful optical device in the construction of an OADM node.

A configuration as shown in FIG. 22, for example, is an example of a specific configuration of an OADM node using such an AOTF (see for example Japanese Unexamined Patent Publication No. 2004-235741). In this configuration example of an OADM node, the WDM light input from the transmission path is branched into two in an optical coupler (CPL) 111, from where one portion of the WDM light is sent to a rejection/add filter 121, and the other is sent to an optical coupler (CPL) 112 and further branched into four portions. The WDM light output from each output port of the optical coupler 112 is respectively applied to a wavelength tunable filter 113 using an AOTF or the like, thereby selecting the desired wavelength and extracting the drop light. Furthermore, the add light of each wavelength output to the transmission path, after being respectively amplified to the desired level in an optical amplifier 122, is multiplexed in the optical coupler 123 (CPL) and applied to the rejection/add filter 121. In the rejection/add filter 121, to prevent the add light in the local node from recirculating on the ring network, optical signals included in the WDM light from the optical coupler 111 which have the same wavelengths as the add wavelengths in the local node are terminated, and the remaining through light is multiplexed with the add light from the optical coupler 123 and output to the transmission path.

Furthermore, regarding the ring type optical transmission system as shown in FIG. 19, it is possible to exchange optical signals of various wavelengths between different ring networks by connecting a plurality of (in this case two) different ring networks to each other by a hub node in each network, as shown in FIG. 23 for example. FIG. 24 is an enlarged view of the connection between the hub nodes of the ring networks. As shown in FIG. 24, in each hub node, the WDM light is first demultiplexed into wavelengths λ1 to λn in the optical demultiplexer 101 which are then branched in two by the optical couplers 102. One of the optical signals is sent to the local ring network, and the other optical signal is sent to the adjacent ring network through a connecting optical path 105 provided between the rings. In FIG. 24, only the connecting optical path 105 corresponding to the wavelength λn is shown, but a similar connecting optical path is provided for the other wavelengths. Then whether the optical signals of the local ring network are multiplexed, or optical signals from the adjacent ring network are multiplexed in the optical multiplexer 104 is selected by an optical switch 103. By providing such a connection between hub nodes, optical signals of all wavelengths carried on the different ring networks can be exchanged between the various ring networks, and optical cross-connect can be realized.

However, in the aforementioned ring type optical transmission system as shown in FIG. 19, for example as shown in FIG. 25, when adding an optical signal with a given wavelength (in this case λ3, for example) to the transmission path from the central station N0 and transmitting the optical signal to the desired OADM node, the optical signal with the wavelength λ3 which comes from the central station N0 is terminated at the OADM node N3 which is allocated the same wavelength λ3 as the optical signal, and consequently, the optical signal with the wavelength λ3 cannot propagate to the OADM nodes N4 to N7 which are beyond the OADM node N3. In other words, conventional ring type optical transmission systems present a problem in that communication between the central station and an optional OADM node, as well as multicast communication and broadcast communication, are difficult to realize.

One method of solving such a problem is for example to set the wavelength of the optical signals transmitted from the central station N0 to a different wavelength from the wavelengths allocated to the OADM nodes. However, this presents a problem in that because a central station which has a need to communicate with all of the nodes on the ring network must be allocated the same number of wavelengths as the total number of wavelengths used in the OADM nodes, the number of wavelengths which can be used in the entire system is reduced by half. Furthermore, as shown for example in FIG. 26, it is possible to realize communication with an optional node, as well as multicast communication and the like, by making each OADM node of the ring network a hub node in the same manner as the central station. However, because a hub node must be compatible with every wavelength included in the WDM light, which increases the scale of the device, this presents a disadvantage in terms of size and cost.

Furthermore, regarding the system as shown in FIG. 23 in which a plurality of ring networks are connected to each other via hub nodes, because a rejection/add filter 121 (FIG. 22) is provided in each OADM node to prevent the same wavelength from recirculating, then when there is communication with an adjacent ring network via a hub node, as shown for example in FIG. 27, an optical signal with a wavelength λ3 added from an OADM node NA3 on a ring network A is terminated at an OADM node NB3 on a ring network B which is allocated the same wavelength λ3. Consequently, the optical signal of wavelength λ3 cannot propagate to the OADM nodes NB4 to NB7 which are beyond the OADM node NB3. That is to say, there is a problem in that multicast communication and broadcast communication between adjacent ring networks connected via hub nodes are difficult to realize.

SUMMARY OF THE INVENTION

The present invention addresses the above points, with an object of providing a ring type optical transmission system which realizes communication between a central station and an optional OADM node, as well as multicast communication and broadcast communication, by means of a simple node configuration which enables effective use of the wavelength band of the system, and providing an optical device connected to this system.

Another object is to provide a ring type optical transmission system which realizes communication between optional nodes in a plurality of ring networks connected via hub nodes, as well as multicast communication and broadcast communication over a plurality of ring networks, by means of a simple node configuration, and to provide an optical device connected to this system.

In order to achieve the above objects, one aspect of the optical device according to the present invention is an optical device which is capable of constructing a ring type optical transmission system by connecting to other optical devices which are each set with a different allocated wavelength, and which has a set allocated wavelength, wherein the optical device comprises: an optical transmitting section which outputs light of the allocated wavelength; and an insertion section which has; a first state in which light of the allocated wavelength in the input light is blocked, while light of the allocated wavelength input from the optical transmitting section, and light in the input light which is not of the allocated wavelength is output, and a second state in which the input light is output, while light of the allocated wavelength input from the optical transmitting section is blocked.

In an optical device with the above construction, it is possible in accordance with the setting of the first state or the second state in the insertion section, to choose between blocking the light of the allocated wavelength contained in the input light and outputting the remaining wavelengths of light as well as the light of the allocated wavelength output from the optical transmitting section, or outputting the input light as-is and blocking the output light from the optical transmitting section. Consequently, communication with an optional optical device in a ring type optical transmission system, as well as multicast communication and broadcast communication can be realized.

Furthermore, another aspect of the optical device according to the present invention is an optical device which is capable of constructing a ring type optical transmission system by connecting to other optical devices which are each set with a different allocated wavelength, and which has a set allocated wavelength, wherein the optical device comprises: an optical transmitting section which outputs light of the allocated wavelength; and an insertion section which comprises; a branching device which branches the input light into light of the allocated wavelength and light which does not include the allocated wavelength, an optical switch which receives the input of both the light of the allocated wavelength branched by the branching device and the light from the optical transmission section, and selects the output light by switching between them, and a multiplexer device which multiplexes the light which does not include the allocated wavelength as branched by the branching device, and the output light of the optical switch.

In an optical device with the above construction, by switching the optical switch of the insertion section, it is possible to choose between blocking the light of the allocated wavelength included in the input light and outputting the remaining wavelengths of light as well as light of the allocated wavelength output from the optical transmitting section, or outputting the input light as-is and blocking the output light from the optical transmitting section. Consequently, communication with an optional optical device in a ring type optical transmission system, as well as multicast communication and broadcast communication, can be realized.

One aspect of a ring type optical transmission system according to the present invention comprises a plurality of optical devices, at least one central device, and a ring transmission path. The plurality of optical devices are each set with a different allocated wavelength, and comprise; an optical transmitting section which outputs light of the allocated wavelength, and an insertion section which has; a first state in which light of the allocated wavelength in the input light is blocked, while light of the allocated wavelength input from the optical transmitting section, and light in the input light which is not of the allocated wavelength is output, and a second state in which the input light is output, while light of the allocated wavelength input from the optical transmitting section is blocked. The central device is capable of blocking light of a specific wavelength in the input light, while outputting light of that specific wavelength, where the specific wavelength corresponds to at least one of the allocated wavelengths in the plurality of optical devices. The plurality of optical devices and at least one of the central device are connected to the ring transmission path.

In a ring type optical transmission system with the above construction, it is possible to select in each of the plurality of optical devices, whether to block light of the allocated wavelength included in the input light from the ring transmission path and output the remaining wavelengths of light and the light of the allocated wavelength output from the optical transmitting section, to the ring transmission path, or to output the input light as-is to the ring transmission path and block the output light from the optical transmitting section. Consequently, communication between the central device and an optional optical device, as well as multicast communication and broadcast communication can be realized.

Furthermore, another aspect of a ring type optical transmission system of the present invention comprises: a plurality of first ring optical devices; a plurality of second ring optical devices; and a switching device. The plurality of first ring optical devices are connected to a first ring transmission path, each is set a different allocated wavelength, and each comprises; an optical transmitting section which outputs light of the allocated wavelength, and an insertion section which has; a first state in which light of the allocated wavelength in the input light is blocked, while light of the allocated wavelength input from the optical transmitting section, and light in the input light which is not of the allocated wavelength is output, and a second state in which the input light is output, while light of the allocated wavelength input from the optical transmitting section is blocked. The plurality of second ring optical devices are connected to a second ring transmission path, each is set with a different allocated wavelength, and each comprises; an optical transmitting section which outputs light of the allocated wavelength, and an insertion section which has; a first state in which light of the allocated wavelength in the input light is blocked, while light of the allocated wavelength input from the optical transmitting section, and light in the input light which is not of the allocated wavelength is output, and a second state in which the input light is output, while light of the allocated wavelength input from the optical transmitting section is blocked. The switching device is connected to the first and second ring transmission paths, and is capable of switching between a first state in which the first and second ring transmission paths are connected to each other, and a second state in which the first and second ring transmission paths are closed and independent.

In a ring type optical transmission system with the above construction, it is possible to select in the optical devices on the first and second ring transmission path connected to each other via the switching device, whether to block light of the allocated wavelength included in the input light from the ring transmission path and output the remaining wavelengths of light and the light of the allocated wavelength output from the optical transmitting section to the ring transmission path, or output the input light as-is to the ring transmission path and block the output light from the optical transmitting section. Consequently, communication between an optional optical device on the different ring transmission paths, as well as multicast communication and broadcast communication can be realized.

According to the ring type optical transmission system of the present invention and the optical device connected thereto as described above, in various forms of ring type optical transmission systems, by means of a simple optical device configuration which allows effective use of the wavelength band of the system, communication between optional optical devices, as well as multicast communication and broadcast communication can be performed. Such a ring type optical transmission system is well suited to the realization of a network which is compatible with image distribution and broadcasting type services.

Other objects, features and advantages of the present invention will become apparent from the following description of embodiments, in conjunction with the appended drawings.

DETAILED DESCRIPTION OF THE INVENTION

As follows is a description of the best mode for carrying out the present invention, with reference to the appended drawings. Throughout all of the diagrams, the same reference symbols refer to the same or corresponding parts.

Figure 1:
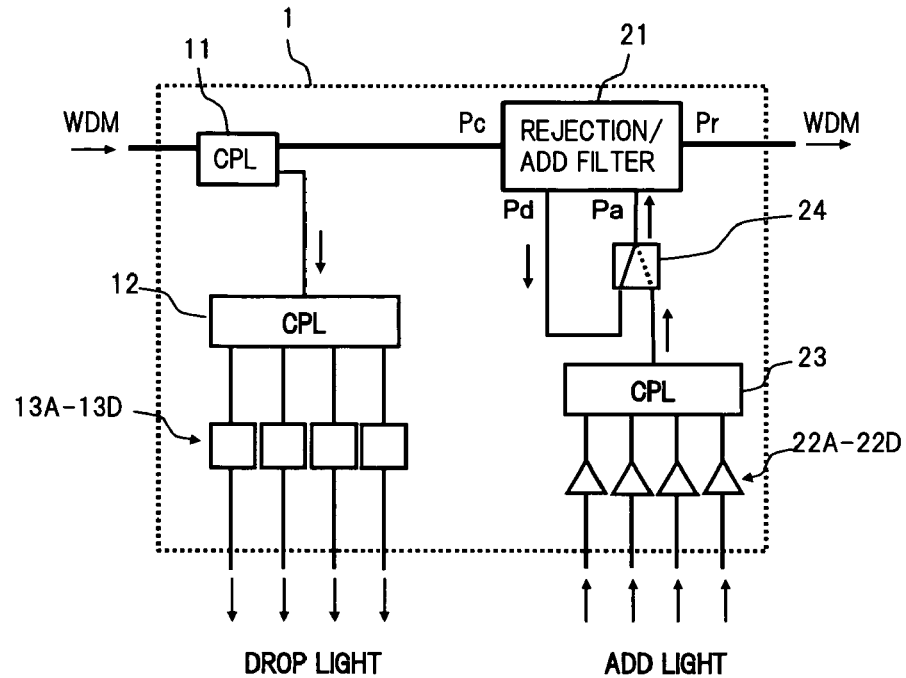
FIG. 1 is a block diagram showing the construction of an OADM node, as one embodiment of an optical device connected to a ring type optical transmission system of the present invention.

FIG. 1 is a block diagram showing the construction of an OADM node, as one embodiment of an optical device connected to a ring type optical transmission system of the present invention.

Figure 22:
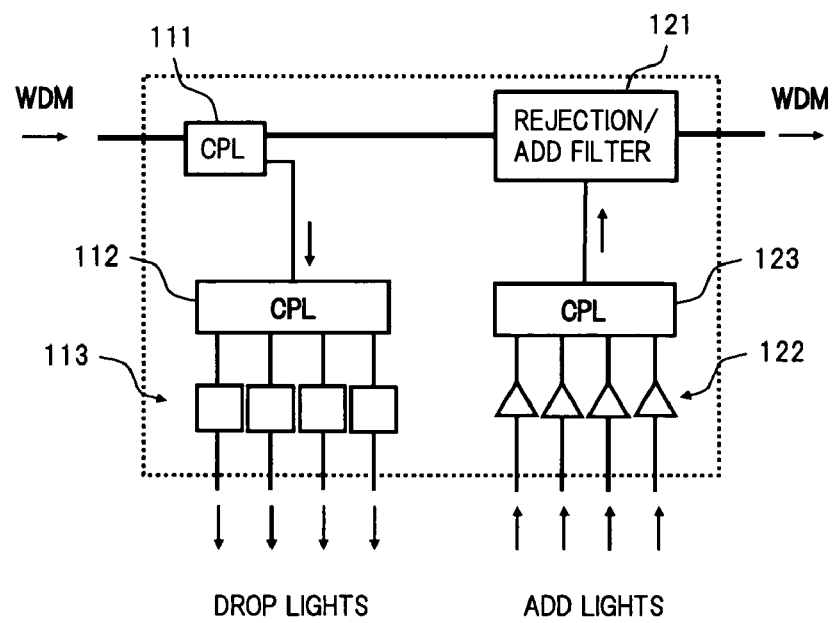
FIG. 22 is a diagram showing a conventional configuration example of an OADM node in the system of FIG. 19.

In FIG. 1, this OADM node 1 has the same construction as the conventional OADM node, shown in FIG. 22 for example, with the exception that instead of a rejection/add filter 121 which terminates in the interior, optical signals included in the input light which have the same wavelengths as the add light, to prevent the add light from the local node from recirculating on the ring network, a rejection/add filter 21 is provided which is capable of extracting optical signals included in the input light which have the same wavelengths as the add light, and in that the optical signal extracted from a drop port Pd of the rejection/add filter 21 is applied to an add port Pa of the rejection/add filter 21 via a newly provided optical switch 24. The construction of the other components of the OADM node, excluding the rejection/add filter 21 and the optical switch 24, are the same as in the conventional construction shown in FIG. 22.

In the construction of the OADM node 1 above, the rejection/add filter 21 and the optical switch 24 correspond to the insertion section, and optical amplifiers 22A to 22D, which amplify the add lights, and the optical coupler 23 correspond to the optical transmitting section. Furthermore, the rejection/add filter 21 also functions as a branching device and a multiplexer device.

Figure 2:
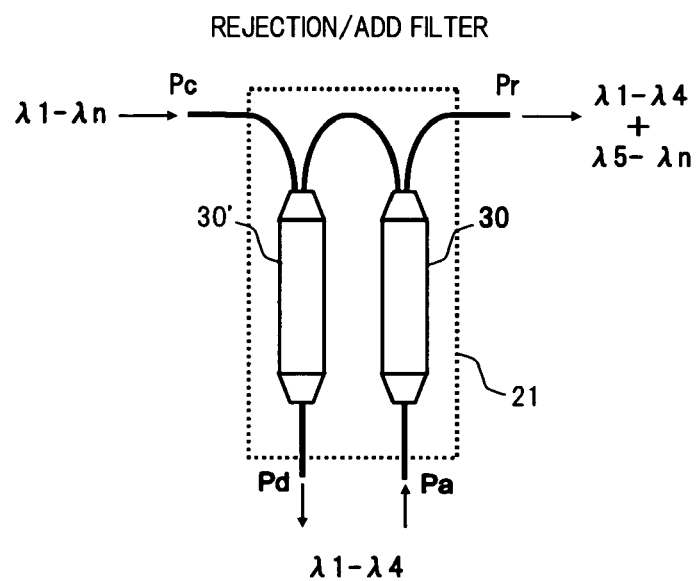
FIG. 2 is a diagram showing a configuration example of a rejection/add filter used in the OADM node of FIG. 1.

FIG. 2 is a diagram showing a specific configuration example of the rejection/add filter 21. In this configuration example, a single rejection/add filter 21 provided with the functions mentioned above is realized by combining known rejection/add filters 30 and 30' having three ports each. As shown on the left side of FIG. 3, one of the rejection/add filters 30 comprises a common port Pc, a reflection port Pr, and an add port Pa. Furthermore, as shown on the right side of FIG. 3, optical fibers 21 leading to each port, lenses 32 and 34, a multilayer film filter 33, and a terminator 35 are provided inside the main body of the rejection/add filter. The multilayer film filter 33 is a typical optical filter having a transmission wavelength band corresponding to the wavelength of the add light, and is also known as a thin film filter (TFF). In this rejection/add filter 30, the light emerging from the end face of the optical fiber 31 which leads to the common port Pc is irradiated onto the upper surface of the multilayer film filter 33 via the lens 32, the light component within the transmission wavelength band passes through the multilayer film filter 33, and is terminated at the terminator 35, via the lens 34, and the light component which is outside of the transmission wavelength band is reflected at the multilayer film filter 33 and enters the end face of the optical fiber 31 leading to the reflection port Pr, via the lens 32. Furthermore, the light emerging from the end face of the optical fiber 31 leading to the add port Pa is irradiated onto the lower surface of the multilayer film filter 33 via the lens 34, and the light component within the transmission wavelength band passes through the multilayer film filter 33 and enters the end face of the optical fiber 31 leading to the reflection port Pr, via the lens 32.

Figure 4:
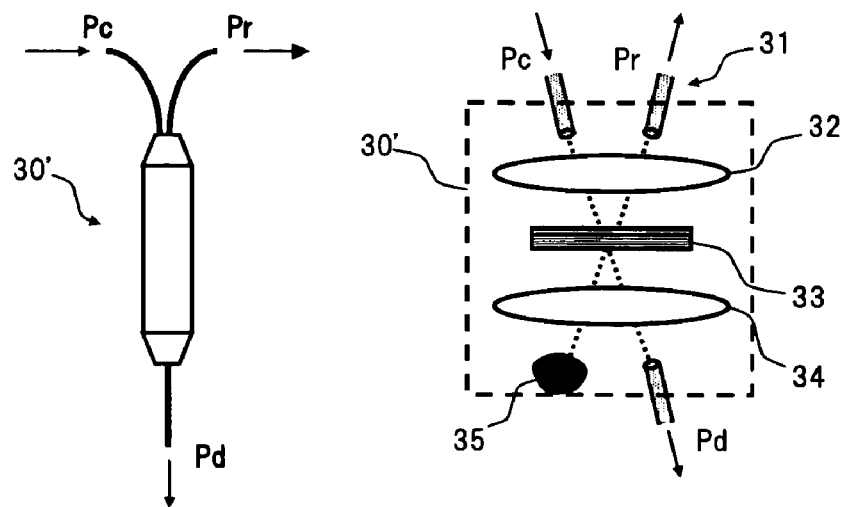
FIG. 4 is a second diagram showing a specific construction of the rejection/add filter of FIG. 2.

As shown on the left side of FIG. 4, for example, the other rejection/add filter 30' comprises a common port Pc, a reflection port Pr, and a drop port Pd. Furthermore, as shown on the right side of FIG. 4, in the same manner as the rejection/add filter 30 described above, optical fibers 31, lenses 32 and 34, a multilayer film filter 33, and a terminator 35 are provided inside the main body of the rejection/add filter. In this rejection/add filter 30', the light emerging from the end face of the optical fiber 31 which leads to the common port Pc is irradiated onto the upper surface of the multilayer film filter 33 via the lens 32, the light component within the transmission wavelength band passes through the multilayer film filter 33, and enters the end face of the optical fiber 31 leading to the drop port Pd, via the lens 34, and the light component which is outside of the transmission wavelength band is reflected at the multilayer film filter 33 and enters the end face of the optical fiber 31 leading to the reflection port Pr, via the lens 32.

Figure 3:
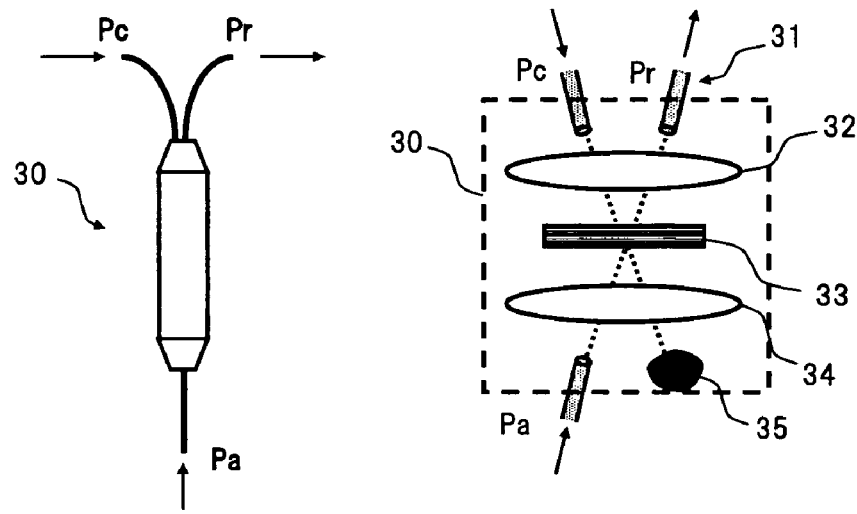
FIG. 3 is a first diagram showing a specific construction of the rejection/add filter of FIG. 2.

The rejection/add filter 21 shown in FIG. 2 is constructed by connecting the reflection port Pr of the rejection/add filter 30' shown in FIG. 4 directly to the common port Pc of the rejection/add filter 30 shown in FIG. 3. By employing such a construction, it is possible to extract, from the drop port Pd, optical signals with the same wavelengths as the add light input to the add port Pa (for example $\lambda 1$ to $\lambda 4$ in FIG. 2) from among the optical signals of the wavelengths $\lambda 1$ to $\lambda n$ input to the common port Pc of the rejection/add filter 21. The optical signals of the remaining wavelengths $\lambda 5$ to $\lambda n$ and the light with the wavelengths $\lambda 1$ to $\lambda 4$ input to the add port Pa, are output from the reflection port Pr.

Here an example is shown of the construction where two rejection/add filters 30 and 30' are combined to form a single rejection/add filter 21. However, the construction of a rejection/add filter applicable to the present invention is not limited to this example.

The optical switch 24 (FIG. 1) has two input terminals and one output terminal. One of the input terminals is connected to the drop port Pd of the rejection/add filter 21, the other input terminal is connected to an output port of the optical coupler 23 which multiplexes a plurality of add lights, and the output terminal is connected to the add port Pa of the rejection/add filter 21. This optical switch 24 switches the optical path between the input and output terminals according to control signals applied from the network management system (NMS) which manages the communication status of the entire system, although this is omitted in the drawings.

In such an OADM node 1 constructed as described above, the WDM light input from the ring network is branched in two in the optical coupler 11. One of the WDM lights is sent to the rejection/add filter 21, and the other WDM light is sent to the optical coupler 12 and branched again into a plurality (four in this case) of lights. The WDM light output from each output port of the optical coupler 12 is applied to AOTF based wavelength tunable filters 13A to 13D, respectively, for example, thereby selecting the desired wavelength and extracting the drop light. Regarding the WDM light sent to the rejection/add filter 21, optical signals with the same wavelengths as the add wavelengths, serving as the allocated wavelengths set in the local node, are extracted from the drop port Pd of the rejection/add filter 21, and applied to one of the input terminals of the optical switch 24. A plurality of add lights which are generated by a wavelength tunable light source or the like (not shown) and multiplexed in the optical coupler after traveling via the optical amplifiers 22A to 22D are applied to the other input terminal of the optical switch 24, and the optical switch 24 switches the optical path according to control signals from the NMS. In the present specification, regarding the settings of the optical switch 24, a state in which the add light from the optical coupler 23 is output to the add port Pa of the rejection/add filter 21 is deemed the "add" state (the first state), and a state in which the optical signals from the drop port Pd of the rejection/add filter 21 are output to the add port Pa of the rejection/add filter 21 is deemed a "through" state (the second state). In the rejection/add filter 21, the optical signal remaining after removing the component with the same wavelength as the add wavelength from the WDM light sent from the optical coupler, is multiplexed with the optical signal output from the optical switch 24, and output to the ring network from the reflection port Pr of the rejection/add filter 21.

Figure 19:
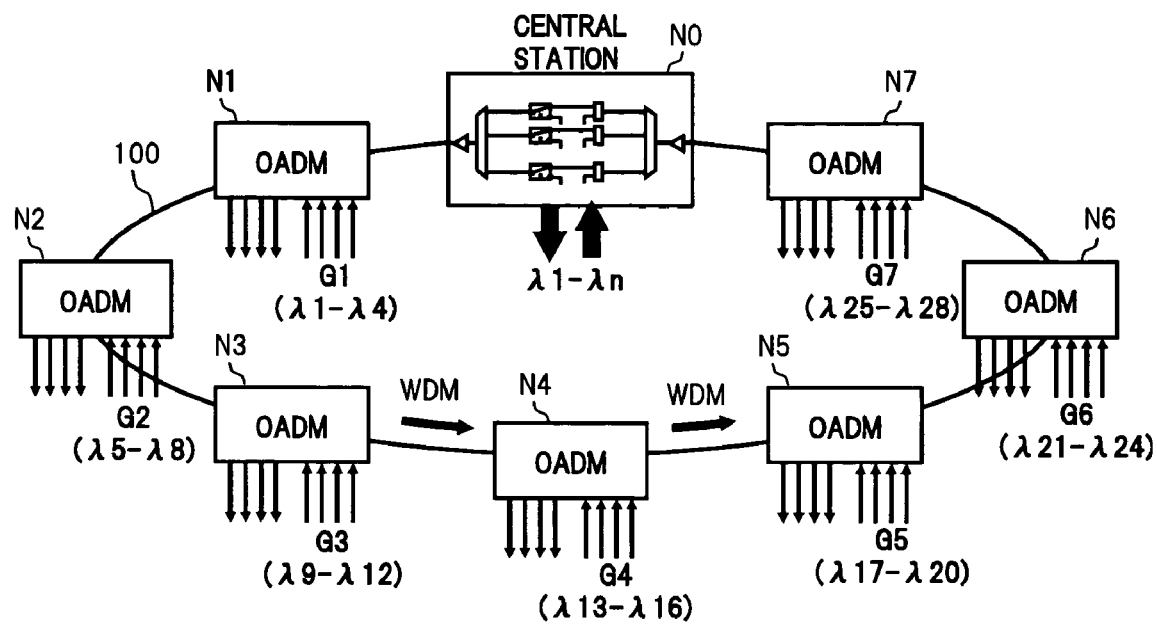
FIG. 19 is a diagram showing a configuration example of a typical ring type optical transmission system with OADM nodes.
Figure 20:
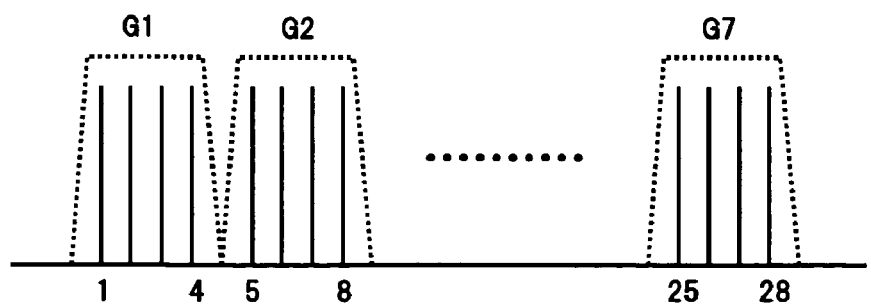
FIG. 20 is a diagram showing settings examples for add wavelengths allocated to each OADM node in the system of FIG. 19.

In using the OADM node 1 as described above, for example by constructing a ring type optical transmission system centered about a central station as shown in FIG. 19, it is possible to realize communication between the central station and an optional OADM node, as well as multicast communication and broadcast communication, which were problematic for conventional systems. Regarding this, here for example is a specific description based on the assumption of a ring type transmission system with the construction shown in FIG. 5.

Figure 5:
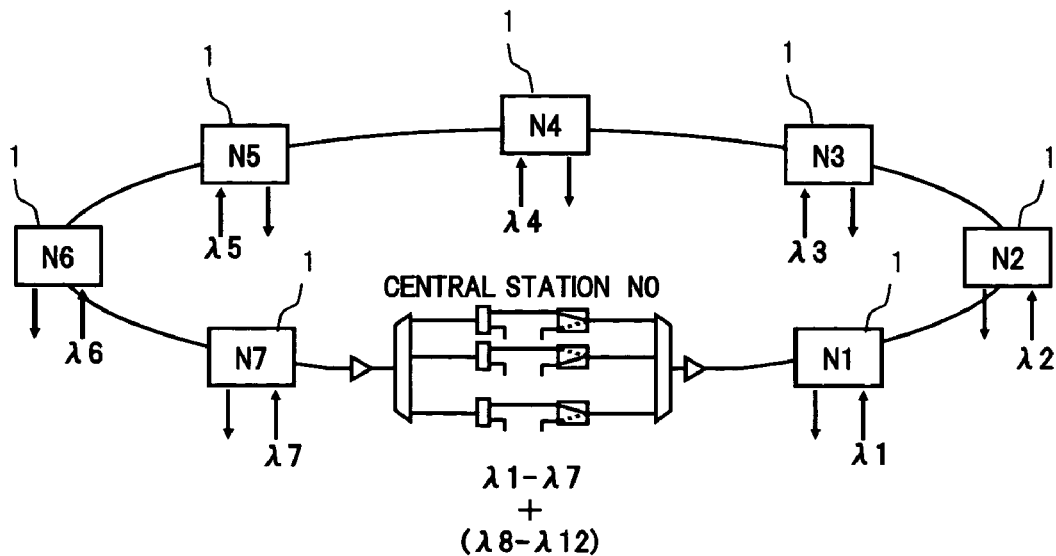
FIG. 5 is a diagram showing a configuration example in which the OADM node of FIG. 1 is applied to a ring type optical transmission system centered around a central station.

In the system configuration shown in FIG. 5, the OADM node 1 shown in FIG. 1 as described above is applied to each of the nodes N1 to N7 in the ring network, and an add wavelength $\lambda 1$ to $\lambda 7$ is allocated to each node N1 to N7, corresponding to the node number of that node. For the sake of simplifying the description here, only one wavelength is allocated as the add wavelength to each OADM node, but naturally it is possible to allocate two or more wavelengths to each OADM node. For the central station N0, which acts as the central device, here for example the known construction described above and shown in FIG. 21 is applied. The same wavelengths $\lambda 1$ to $\lambda 7$ as the add wavelengths (allocated wavelengths) of the OADM nodes are set as the add wavelengths (specific wavelengths) capable of being transmitted over the ring network from the central station N0.

Figure 6:
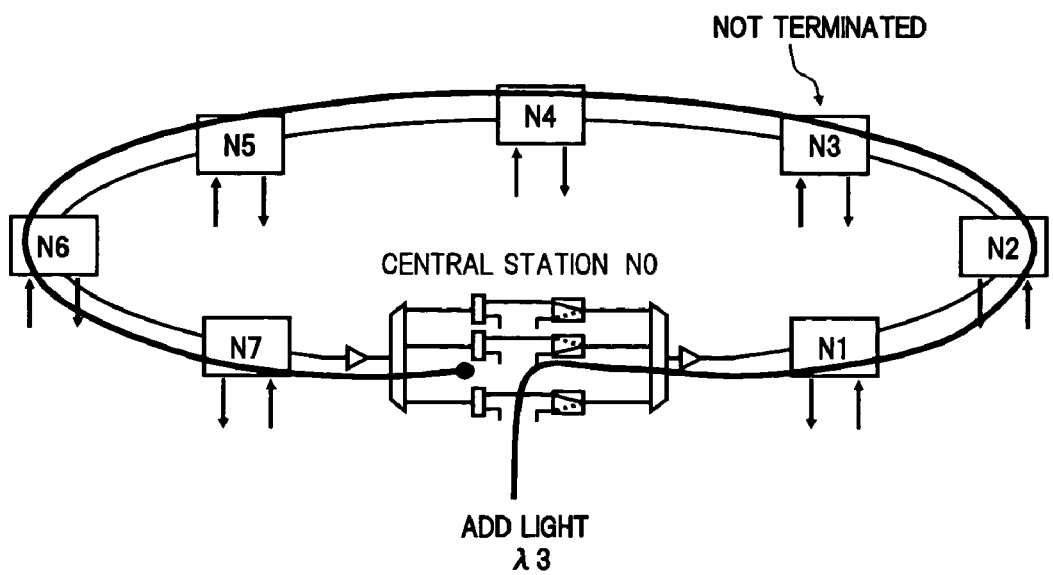
FIG. 6 is a diagram for explaining the operation of the ring type optical transmission system of FIG. 5.

In such a ring type optical transmission system, as shown for example in FIG. 6, when transmitting an optical signal with the wavelength $\lambda 3$ over the ring network from the central station N0, by setting the optical switch 24 in the OADM node N3 to the "through" side, the optical signal with the wavelength $\lambda 3$ from the central station N0 is transmitted to the OADM nodes N4 to N7 which are beyond the OADM node N3, without being terminated at the OADM node N3. As a result, the optical signal with the wavelength $\lambda 3$ from the central station N0 can be dropped in every OADM node N1 to N7 on the ring network. Consequently, communication between the central station N0 and an optional OADM node, as well as multicast communication and broadcast communication, are possible.

When add light is transmitted onto the ring network from a given OADM node, if an attempt is made to send an optical signal with the same wavelength as that add light from the central station N0 to each OADM node, conceivably, the optical signal from the central station N0 may be terminated at the OADM node which is transmitting the add light, and not reach the OADM nodes which are beyond that node. In order to avoid such a situation, a wavelength which is different from the add wavelengths of all of the OADM nodes (for example a wavelength from $\lambda 8$ to $\lambda 12$) may be added as one of the usable wavelengths allocated to the central station N0. As a result, multicast communication and broadcast communication from the central station N0 are possible even in the above situation.

The setting of various communication states in such a ring type optical transmission system is realized by controlling the optical switches 103 (FIG. 21) in the central station N0 which correspond to each wavelength, and the optical switches 24 (FIG. 1) in the OADM nodes N1 to N7, in a synchronized manner according to control signals output for example from the NMS.

Figure 7:
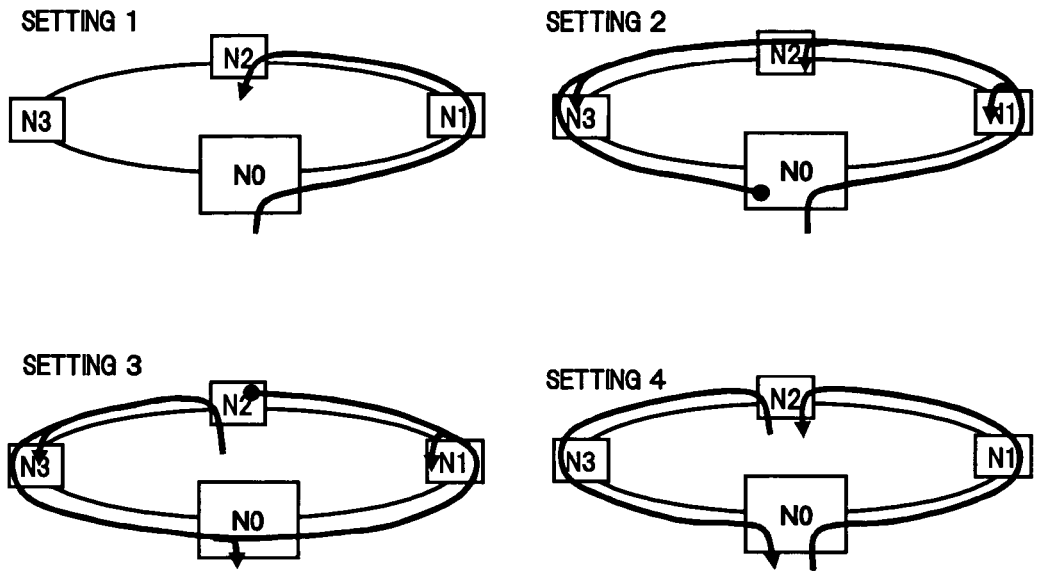
FIG. 7 is a diagram for explaining control by an NMS in a ring type optical transmission system centered around a central station.

Here, the control by the NMS is described simply, assuming four communication states in a simplified system configuration comprising a central station and three OADM nodes N1 to N3, as shown in FIG. 7. In each of the states shown in FIG. 7, the start and end points of communication are indicated by the beginning and end of the arrows, and a circle indicates the termination (blocking) of light of the wavelength corresponding to the communication.

Setting 1 shown at the top left of FIG. 7 shows a communication state in which an optical signal is transmitted from the central station to an optional OADM node (in this case OADM node N2). Setting 2 shown at the top right of FIG. 7 shows a state in which broadcast communication is performed from the central station to all of the OADM nodes. Setting 3 shown at the bottom left of FIG. 7 shows a state in which broadcast communication is performed from an optional OADM node (in this case OADM node N2) to the other nodes including the central station. Setting 4 shown at the bottom right of FIG. 7 shows a state in which optical signals with the same wavelength are transmitted bidirectionally between the central station and an optional OADM node (in this case OADM node N2). For these communication settings 1 to 4, control is performed by the NMS such that the usable wavelength and the settings of the optical switches 103 in the central station, as well as the setting of the optical switch 24 of the relevant node, are controlled in a synchronized manner according to the combinations shown in Table 1 below.

TABLE 1

| Communication setting | | Usable wavelength of central station | SW setting of central station | SW setting of OADM node |
|---|---|---|---|---|
| Setting 1 | Transmission from central station to OADM node | No limit | Add | Through |
| Setting 2 | Broadcast communication from central station to all OADM nodes | Different from OADM node | Add | No limit |
| Setting 3 | Broadcast communication from OADM node to all other nodes | — | Through | No limit |
| Setting 4 | Bidirectional communication of same wavelength between central station and OADM node | Same as OADM node | Add | Add |

In other words, in communication setting 1, control is performed by the NMS so that add light is selected by the optical switch 103 in the central station, and the optical switch 24 in the OADM node N2 is set to the through state. In communication setting 2, control is performed by the NMS so that the usable wavelength of the central station is set to a different wavelength from all of the wavelengths of the OADM nodes, and add light is selected by the optical switch 103 in the central station. In communication setting 3, control is performed by the NMS so that through light from the optical coupler 102 is selected by the optical switch 103 in the central station. In communication setting 4, control is performed by the NMS so that the usable wavelength of the central station is set to the same wavelength as the OADM node N2, add light is selected by the optical switch 103 in the central station, and the state of the optical switch 24 in the OADM node N2 is the add state.

By applying the OADM node 1 shown in FIG. 1 to a ring type optical transmission system centered about a central station as described above, communication between the central station and an optional OADM node, as well as multicast communication and broadcast communication can be realized with a simple node construction, without reducing by half the number of usable wavelengths over the entire system.

Figure 23:
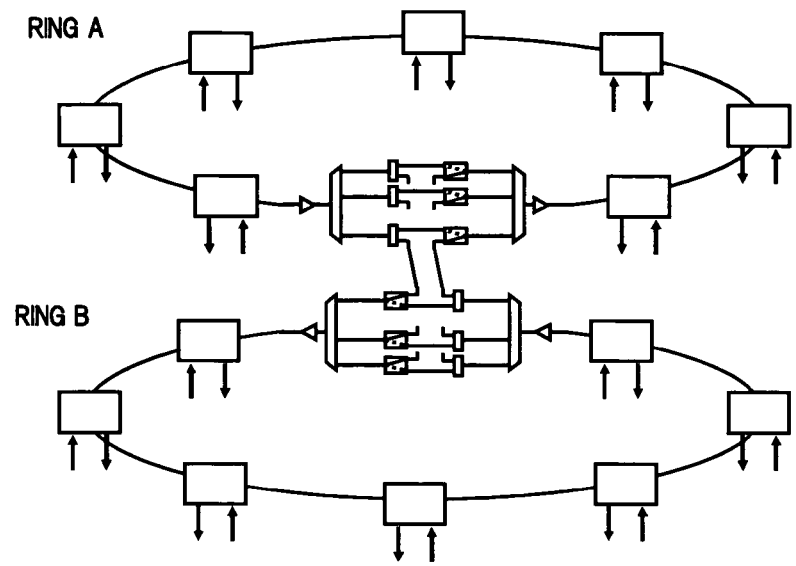
FIG. 23 is a diagram showing an example of a ring type optical transmission system in which two rings are connected.

Next, a case is described in which the OADM node 1 shown in FIG. 1 is applied to a ring type optical transmission system in which a plurality of ring networks are connected by hub nodes as shown in FIG. 23.

Figure 8:
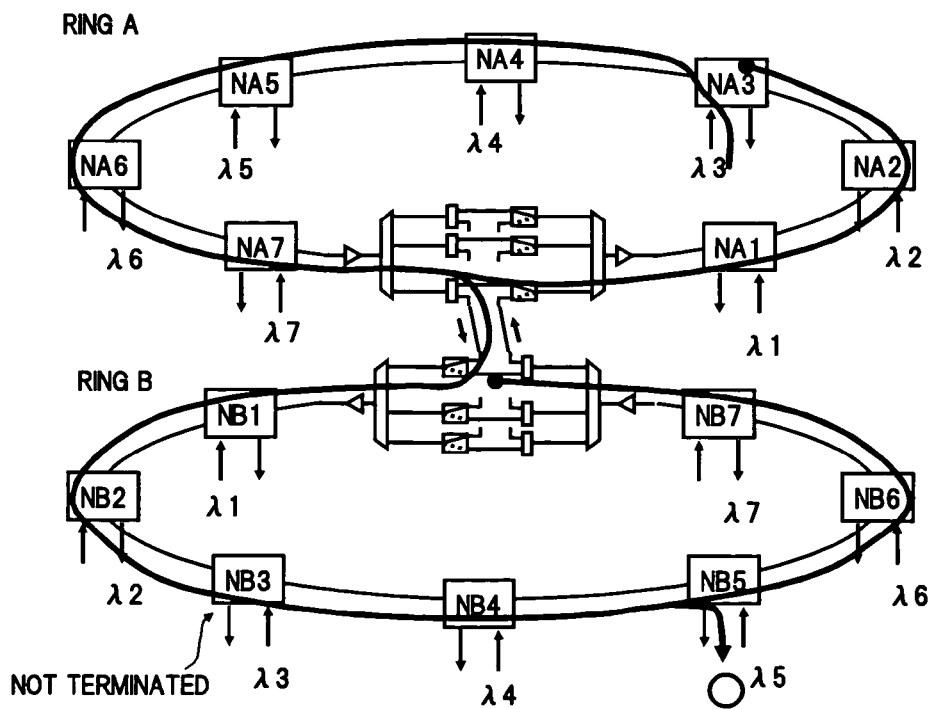
FIG. 8 is a diagram for explaining the operation of a ring type optical transmission system in which two rings are connected, in the case where the OADM node of FIG. 1 is applied.
Figure 24:
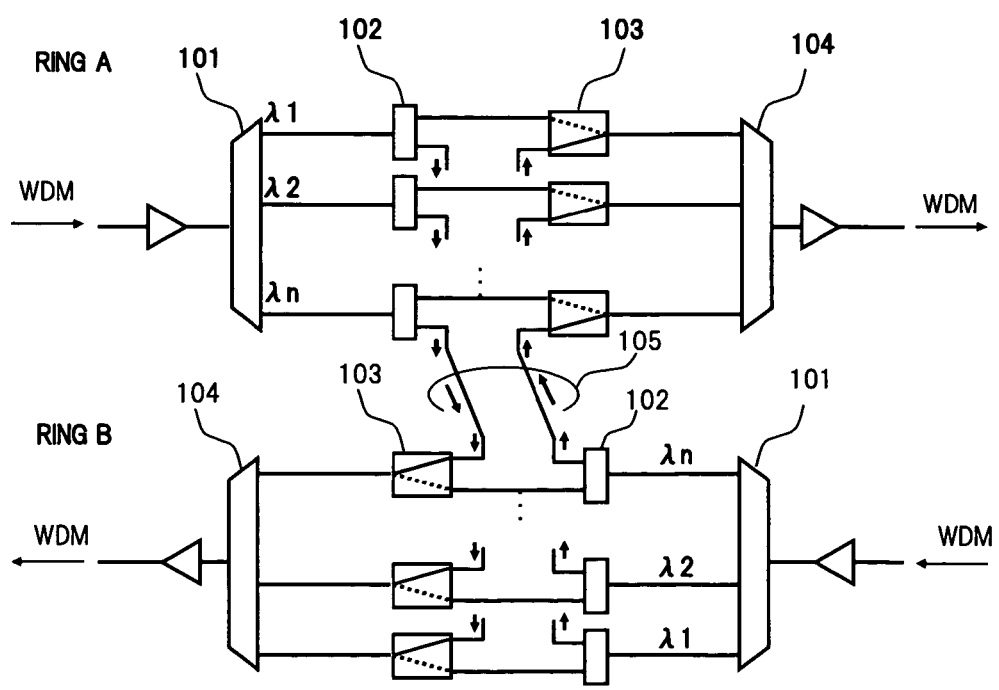
FIG. 24 is an enlarged view of the connection between the hub nodes in the system of FIG. 23.
Figure 25:
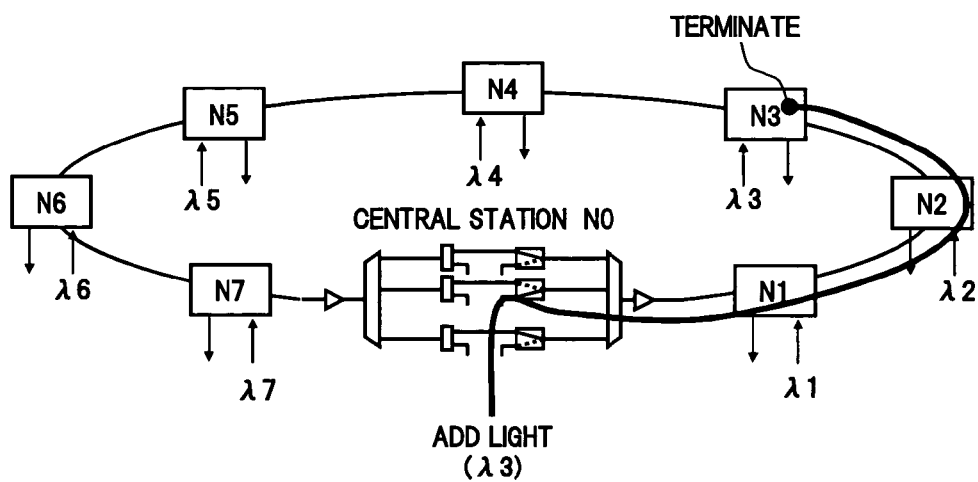
FIG. 25 is a diagram for explaining problems related to the system of FIG. 19.
Figure 26:
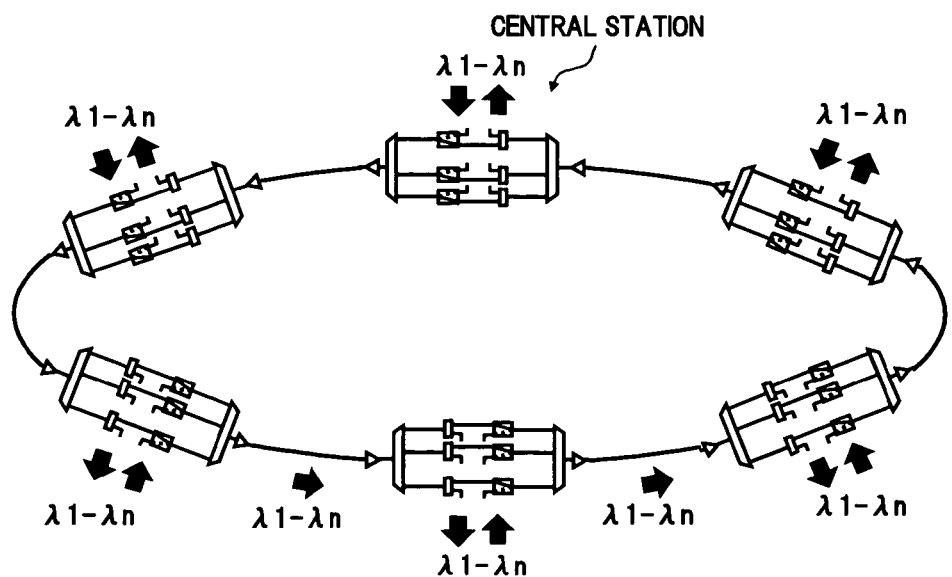
FIG. 26 is a diagram for explaining other problems related to the system of FIG. 19.
Figure 27:
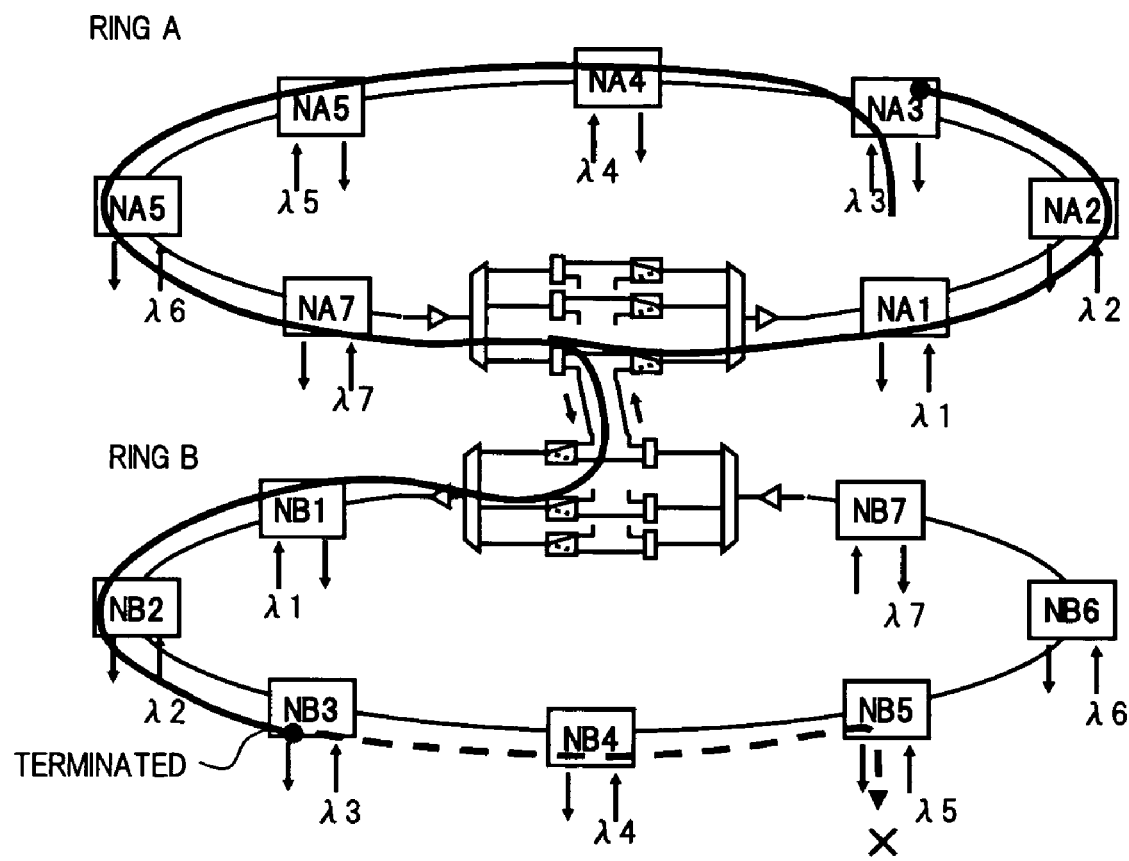
FIG. 27 is a diagram for explaining problems related to the system of FIG. 23.

In this case, by combining two of the ring networks shown in FIG. 5, described above, and providing a mutual connection (see FIG. 24) between the hub nodes which correspond to the central station N0 of each ring network, thereby realizing the function of a switching device, it is possible to realize communication between optional nodes in different ring networks which are connected via hub nodes, as well as multicast communication and broadcast communication across a plurality of ring networks, which were problematic for conventional systems. Specifically, as shown for example in FIG. 8, an optical signal with a wavelength λ3 added to the ring network A from the OADM node NA3 passes through the OADM nodes NA4 to NA7, in that order, and is branched in two in the hub node, after which the optical signal which continues to circulate the ring network A is terminated at the rejection/add filter 21 of the OADM node NA3. On the other hand, by setting the optical switch 24 in the OADM node NB3 on the ring network B to the through side, the optical signal with the wavelength λ3 which is sent from the ring network A to the ring network B via the hub nodes is not terminated at the OADM node NB3, and is transmitted onward to the OADM nodes NB4 to NB7. As a result, the optical signal with the wavelength λ3 added from the OADM node NA3 can be dropped not only at the OADM nodes NA1, NA2 and NA4 to NA7 on the ring network A, but also at all of the OADM nodes NB1 to NB7 on the ring network B. Consequently, multicast communication and broadcast communication are possible between different ring networks connected via a hub node. The setting of various communication states between two such ring networks A and B is realized by controlling the switching of the optical switches 103 (FIG. 21) corresponding to each wavelength in the hub node of each ring network, and the optical switches 24 (FIG. 1) in the OADM nodes NA1 to NA7 and NB1 to NB7, in a synchronized manner according to control signals output from the NMS.

Figure 9:
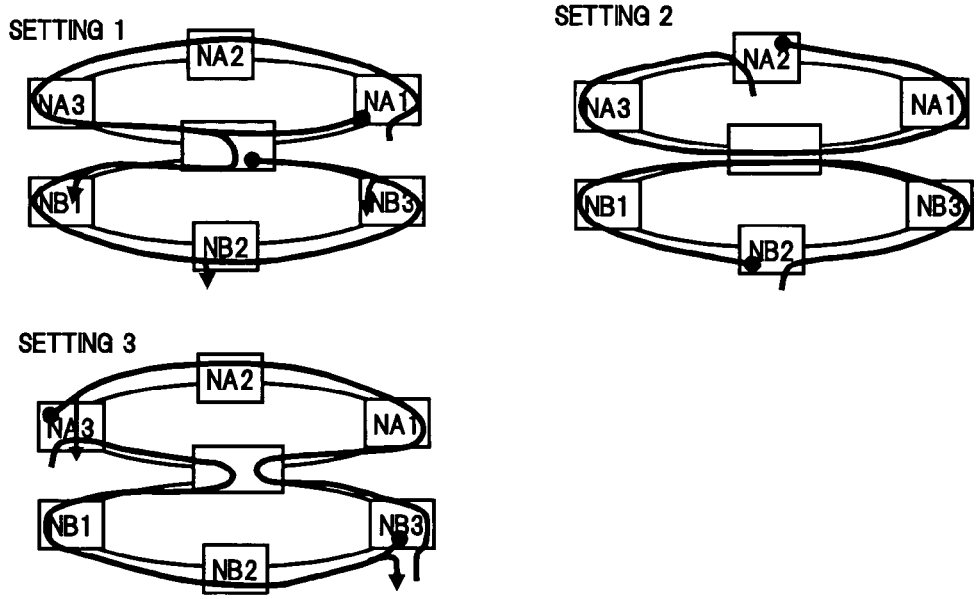
FIG. 9 is a diagram for explaining control by an NMS in a ring type optical transmission system in which two rings are connected.

Here, the control by the NMS is described simply, assuming three communication states in a simplified system configuration comprising three OADM nodes NA1 to NA3 and NB1 to NB3 arranged on each ring network A and B as shown in FIG. 9. In each of the states shown in FIG. 9, the communication start and end points are indicated by the beginning and end of the arrows, and a circle indicates the termination (blocking) of light of the wavelength corresponding to the communication.

Setting 1 shown at the top left of FIG. 9 shows a state in which multicast communication is performed from an optional OADM node on the ring network A (in this case OADM node NA1) to the ring network B. Setting 2 shown at the top right of FIG. 9 shows a state in which communication is not performed between the ring networks A and B, that is a state where the ring networks A and B are closed and independent. Setting 3 shown at the bottom left of FIG. 9 shows a state in which bidirectional communication is performed between an optional OADM node (in this case OADM node NA3) in the ring network A and the OADM node in the ring network B with the corresponding wavelength (in this case OADM node NB3). For these communication settings 1 to 3, control is performed by means of the NMS so that the settings of the optical switches 103 in the hub nodes in each of the ring networks A and B, and the setting of the optical switch 24 in each OADM node, are controlled in a synchronized manner according to the combinations shown in Table 2 below.

TABLE 2

| | | Device setting of each node | |
|---|---|---|---|
| | Communication setting | SW setting of hub node | SW setting of OADM node |
| Setting 1 | Multicast communication from ring A to ring B | Cross | Through |
| Setting 2 | No communication between rings A and B | Through | Add |
| Setting 3 | Bidirectional communication with same wavelength between rings A and B | Cross | Add |

In other words, in communication setting 1, control is performed by the NMS so that the optical switch 103 corresponding to the wavelength λ1 in the hub nodes is in the cross state (the first state) in which optical signals from the adjacent ring network are selected, and the optical switch 24 of the OADM node NB1 is in the through state. In communication setting 2, control is performed by the NMS so that the optical switches 103 corresponding to each wavelength of the hub node are set to the through state (the second state) in which optical signals from the local ring network are selected, and the optical switches 24 of each OADM node in both ring networks A and B are set to the add state. In communication setting 3, control is performed by the NMS so that the optical switches 103 corresponding to the wavelength λ3 in the hub nodes are set to the cross state in which optical signals from the adjacent ring network are selected, and the optical switches 24 of the OADM nodes NA3 and NB3 are set to the add state.

By applying the OADM node 1 of FIG. 1 to a ring type optical transmission system in which two ring networks are connected to each other by hub nodes (switching devices) as described above, multicast communication and broadcast communication between different ring networks can be realized with a simple node configuration.

Figure 10:
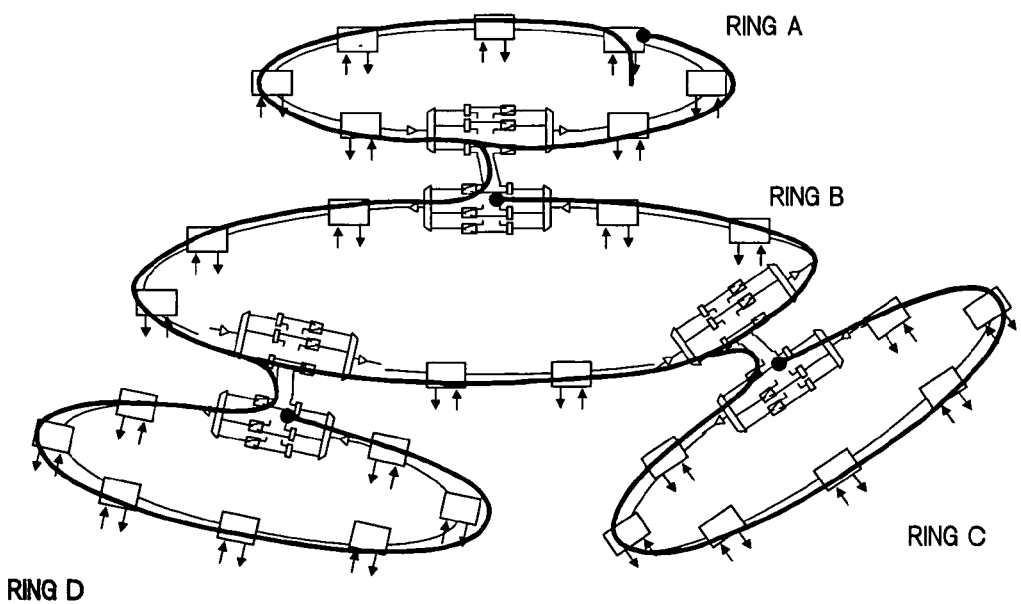
FIG. 10 is a diagram showing an example of a case where the OADM node of FIG. 1 is applied to a ring type optical transmission system in which three rings are connected.

In the above description, an example was shown in which two ring networks are connected via hub nodes, but the present invention is not limited to this configuration. For example, the present invention can also be applied in a similar manner to the above case, to a configuration in which, as shown in FIG. 10, three or more (in this case four) ring networks are connected via hub nodes.

Next, an application example of the OADM node 1 shown in FIG. 1 is described.

Figure 11:
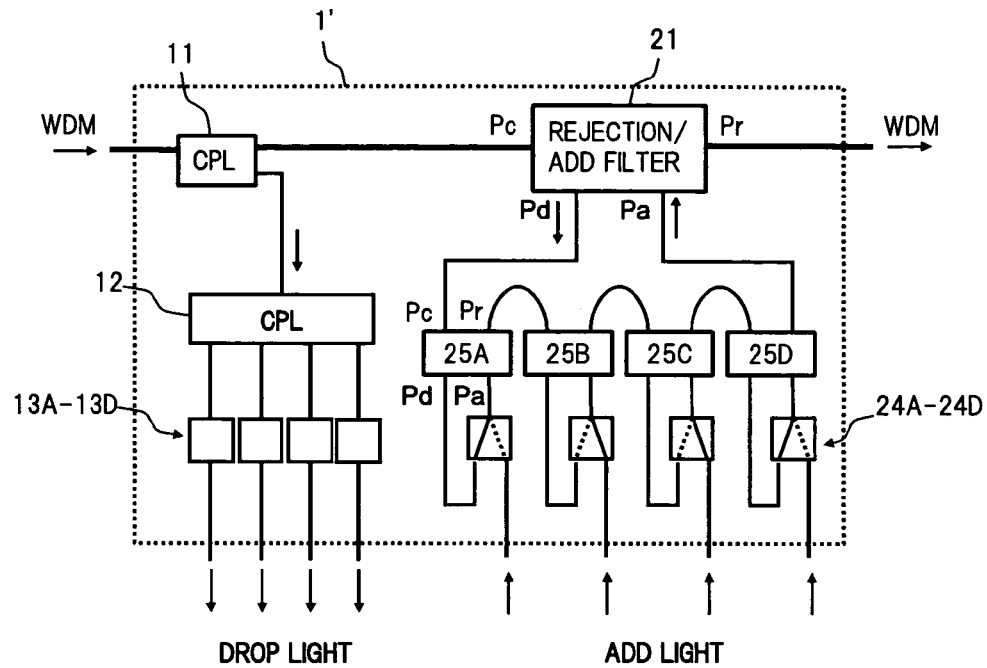
FIG. 11 is a block diagram showing the construction of an application example relating to the OADM node of FIG. 1.

FIG. 11 is a block diagram showing the construction of the application example of the OADM node 1.

In the OADM node 1 shown in FIG. 1 described above, in a state where all the wavelengths of a plurality of add wavelengths allocated to the local node are grouped as one, whether the optical signal (through light) extracted from the drop port Pd of the rejection/add filter 21 is selected, or the add light added to the ring network from the local node is selected is controlled. In contrast, in the OADM node 1' shown in FIG. 11, it is possible to perform control so that either through light or the add light is selected, for each individual add light of the plurality of add lights allocated to the local node, which enables the communication states to be set in a more flexible manner.

Specifically, in the OADM node 1', the through light extracted from the drop port Pd of the rejection/add filter 21 is applied to the common port of a rejection/add filter 25A which has a wavelength transmission band corresponding to one wavelength of the plurality of add wavelengths allocated to the local node, and the optical signal extracted from the drop port Pd of that rejection/add filter 25A is applied to one of the input terminals of the optical switch 24A. Add light having a wavelength corresponding to the wavelength transmission band of the rejection/add filter 25A is applied to the other input terminal of the optical switch 24A, and either one of the input lights is selected and output to the add port Pa of the rejection/add filter 25A. The optical signal output from the reflection port Pr of the rejection/add filter 25A is then applied sequentially in the same manner as above to the rejection/add filters 25B to 25D and the optical switches 24B to 24D which have wavelength transmission bands respectively corresponding to the remaining wavelengths of the plurality of add wavelengths allocated to the local node, and the optical signal output from the reflection port Pr of the final rejection/add filter 25D is applied to the add port Pa of the rejection/add filter 21. As a specific example of the rejection/add filters 25A to 25D, it is possible to apply the construction shown in FIG. 2, described above. The difference to the rejection/add filter 21 is that instead of the wavelength transmission band of the multilayer film filter 33 being one which includes all of the plurality of add wavelengths, this is one which corresponds individually to each add wavelength. Furthermore, the switching of each optical switch 24A to 24D is respectively controlled according to control signals from the NMS (not shown).

In the configuration example shown in FIG. 11, a case is shown in which each wavelength of add light is input directly to the optical switches 24A to 24D. However, in the same manner as for FIG. 1 above, it is possible to apply add light of each wavelength to the optical switches 24A to 24D, after the light is amplified to the desired level using optical amplifiers.

Figure 12:
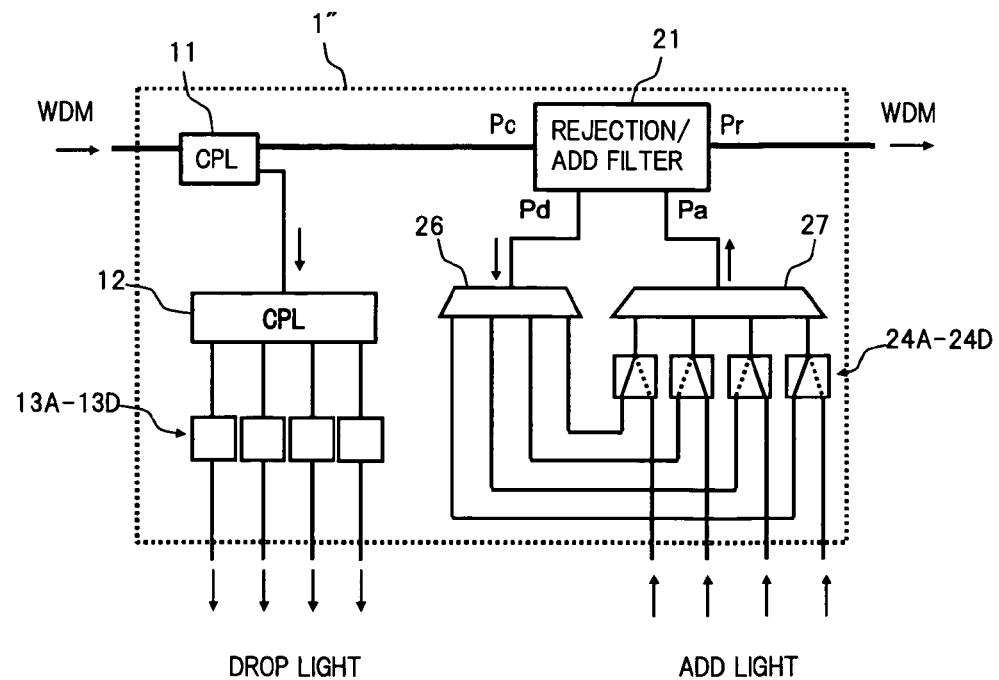
FIG. 12 is a block diagram showing the construction of a modified example relating to the OADM node of FIG. 11.

FIG. 12 is a block diagram showing a modified example relating to the OADM node 1' of FIG. 11.

In the OADM node 1" shown in FIG. 12, the optical signal extracted from the drop port Pd of the rejection/add filter 21 is demultiplexed into distinct wavelengths in an optical demultiplexer 26, and the optical signals of each wavelength are respectively applied to the corresponding optical switches 24A to 24D corresponding to the wavelengths, in the same manner as for the case of FIG. 11. The through light or add light selected by each of the optical switches 24A to 24D is multiplexed by an optical multiplexer 27 and then applied to the add port Pa of the rejection/add filter 21. By means of the OADM node 1" with such a construction, it is possible to control whether through light or add light is selected corresponding to each of the plurality of add wavelengths allocated to the local node, individually, which enables the communication states to be set in a more flexible manner.

Next, an application example of a central station and hub node applicable to the ring type optical transmission system of the present invention is described.

Figure 13:
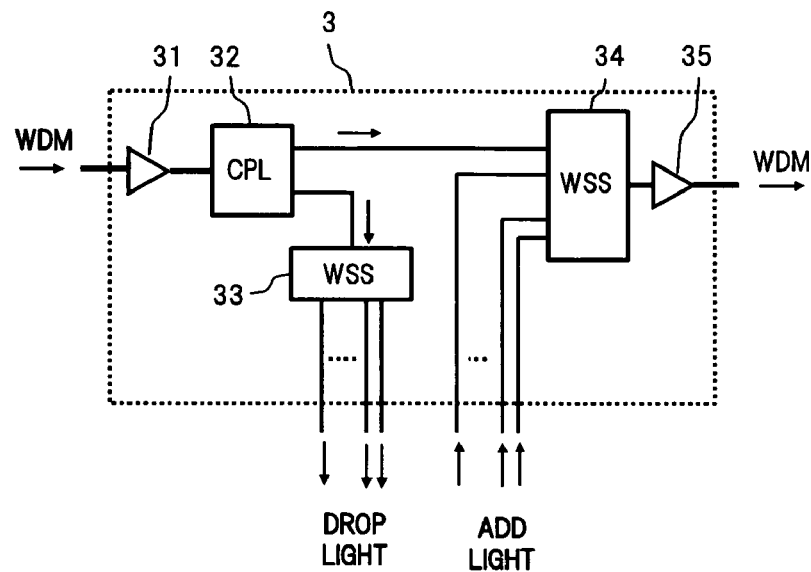
FIG. 13 is a block diagram showing an application example of a central station which can be applied to the ring type optical transmission system of the present invention.

FIG. 13 is a block diagram showing the construction of an application example of a central station.

Figure 21:
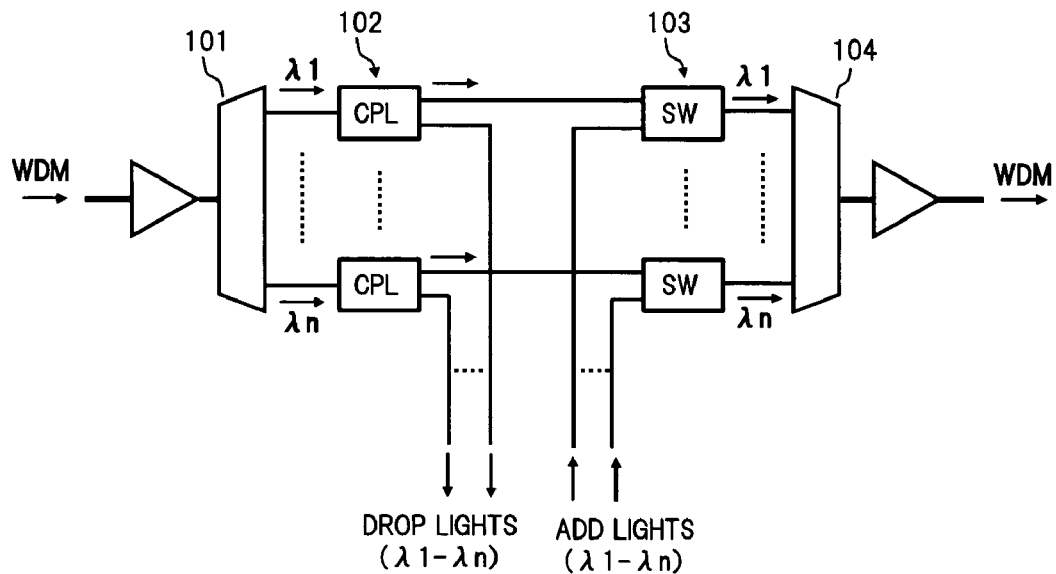
FIG. 21 is a diagram showing a conventional configuration example of a central station in the system of FIG. 19.

In the conventional construction of the central station shown as an example in FIG. 21, WDM light is demultiplexed into optical signals of wavelengths λ1 to λn using an optical demultiplexer 101 and an optical multiplexer 104 which use an arrayed waveguide grating (AWG) or the like, and the optical signals of each wavelength are added or dropped by the optical coupler 102 and the optical switch 103 corresponding to that wavelength. In contrast, in a central station 3 shown in FIG. 13, by using a wavelength selective switch (WSS), for example, adding and dropping and the like of the optical signals is performed to correspond with each output port of the wavelength selective switch.

Figure 14:
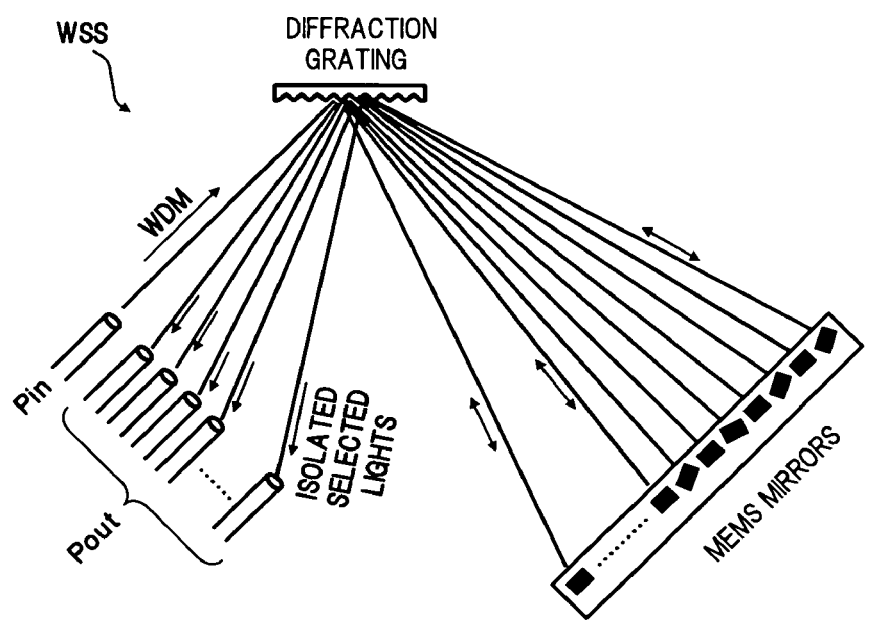
FIG. 14 is a diagram showing a specific example of a wavelength selective switch used in the central station of FIG. 13.
Figure 15:
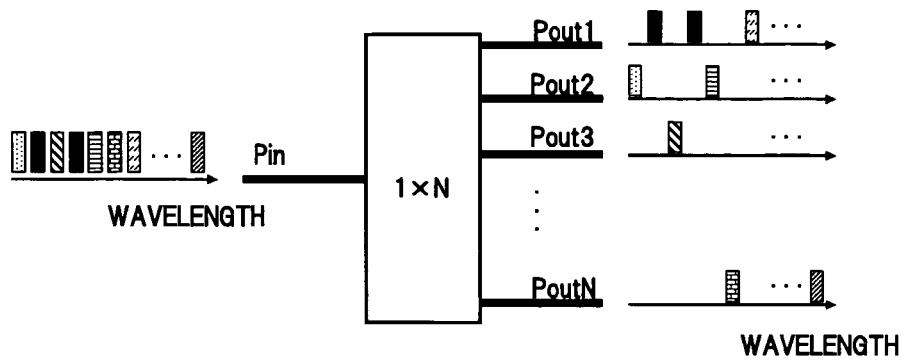
FIG. 15 is a schematic diagram for explaining the characteristics of the wavelength selective switch.

Specifically, the WDM light input from the transmission path is applied to the optical coupler 32 via the optical amplifier 31 or the like, and branched in two. One of the WDM lights is then sent to a wavelength selective switch 33 to extract the drop light, and the other WDM light is multiplexed with the add light and sent to a wavelength selective switch 34 to be output to the transmission path. As shown in FIG. 14 for example, the wavelength selective switches 33 and 34 have one input port Pin and a plurality of output ports Pout, and an optical system comprising a diffraction grating and MEMS mirrors, and are examples of a known optical switch with a characteristic of reversibility, which can select an optional wavelength from the WDM light applied to the input port Pin and output the wavelength to an optional output port Pout, and when the same wavelength is input to each optical port Pout from the opposite direction, can return the wavelength to the input port Pin. FIG. 15 schematically shows the characteristics of such a wavelength selective switch. In the configuration example shown in FIG. 13, the optical signals output from each output port of the wavelength selective switch 33 are extracted as drop lights. Furthermore, in the wavelength selective switch 34, the WDM light branched in the optical coupler 32 and the plurality of add lights transmitted on the ring network are applied to each output port, and WDM light combining these, is output from the input port, and sent to the transmission path via an optical amplifier 35 or the like.

When a construction using such wavelength selective switches is applied to the central station, there is no need to provide multiple optical couplers and optical switches to correspond with each wavelength in the WDM light, as in the configuration example of FIG. 21. Therefore it is possible to realize a compact central station with a simple construction.

Figure 16:
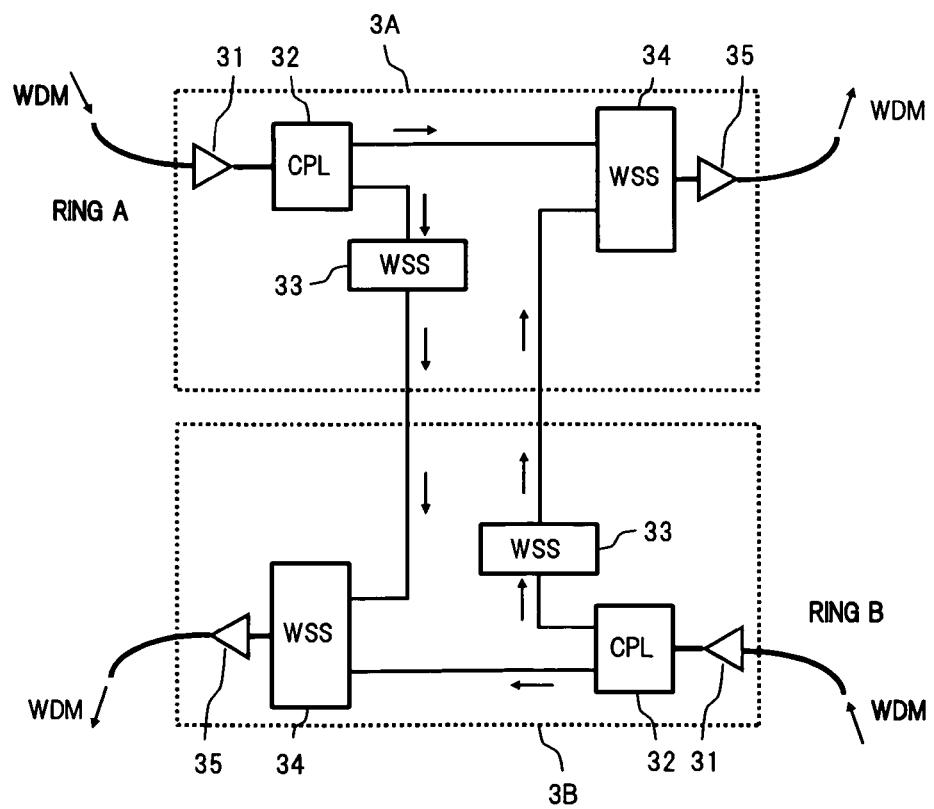
FIG. 16 is a diagram showing an example of where the construction of FIG. 13 is applied to a hub node which connects between a plurality of ring networks.

Furthermore, as shown for example in FIG. 16, it is also possible to apply a construction using such wavelength selective switches to hub nodes (switching devices) which connect between a plurality of ring networks. Specifically, in the configuration example of FIG. 16, in the hub node 3A on the ring network A side, the light branched at the optical coupler 32 is dropped selectively by the wavelength selective switch 33 in the same manner as for the case of FIG. 13 above, and travels through one of the optical paths connected to the wavelength selective switch 34 of the hub node 3B to the ring network B side. Furthermore, in the same manner, the light dropped selectively by the wavelength selective switch 33 of the hub node 3B travels through one of the optical paths connected to the wavelength selective switch 34 of the hub node 3A, to the ring network A side. As a result, optical signals can be exchanged between the ring networks A and B.

Figure 17:
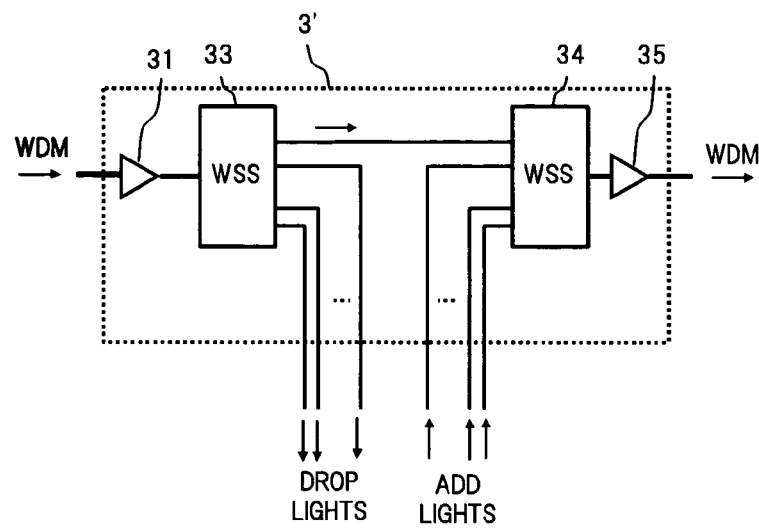
FIG. 17 is a block diagram showing a modified example relating to the construction of FIG. 13.

In the configuration examples in FIG. 13 and FIG. 16, the WDM light input into the central station (hub node) is applied to the wavelength selective switches 33 and 34 after being branched into two signals by the optical coupler 32. However it is also possible to omit the optical coupler 32, as shown for example in FIG. 17, and apply the WDM light input from the ring network to the wavelength selective switch 33 via the optical amplifier 31, and apply the optical signal output from at least one of the output ports of the wavelength selective switch 33 as through light to the wavelength selective switch 34 provided as a subsequent stage. However, with this node construction, if the optical signal with the desired wavelength is dropped by the wavelength selective switch 33, optical signals which have the same wavelength as the drop light cannot be applied to the subsequent wavelength selective switch 34 as through light. Therefore it becomes difficult to perform multicast communication to all nodes on the network at the same wavelength. Consequently, the node configuration shown in FIG. 13 is superior because of its ability to set the communication settings with more flexibility.

Figure 18:
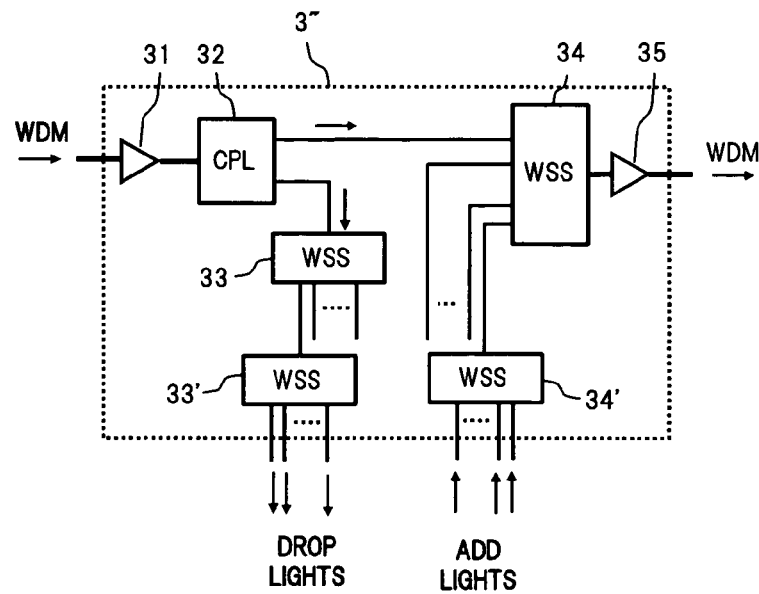
FIG. 18 is another modified example relating to the construction of FIG. 13.

Furthermore, regarding the node construction of FIG. 13, by connecting the input ports of additional wavelength selective switches 33' and 34' to any of the output ports of the wavelength selective switches 33 and 34 as shown in FIG. 18, for example, it is possible to easily increase the number of wavelengths of drop light and add light. Accordingly, it becomes possible to flexibly correspond to system upgrades and the like.

What is claimed is:

1. An optical device which is capable of constructing a ring type optical transmission system by connecting to other optical devices which are each set with a different allocated wavelength, and which has a set allocated wavelength, said optical device comprising:

an optical transmitting section configured to output light of which wavelength is identical to said allocated wavelength; and an insertion section which has; a first state in which light of said allocated wavelength in the input light is blocked, while light of said allocated wavelength input from said optical transmitting section, and light in the input light which is not of said allocated wavelength is output, and a second state in which the input light is output, while light of said allocated wavelength input from said optical transmitting section is blocked;

wherein the insertion section comprises:

an optical filter including at least four ports;

an optical switch including two input ports and an output port;

wherein:

said optical filter includes a first port that receives the input light, a second port that outputs light component of said allocated wavelength out of the input light, a third port that receives an output light from the output port of said optical switch, and a fourth port that outputs a multiplexed light that is obtained by multiplexing light component of wavelength other than said allocated wavelength out of the input light with light inputted to the third port, and said optical switch includes a first input port that receives the output light from the second port of said optical filter, a second input port that receives the light outputted by said optical transmitting section, and the output port that is switchably connected to one of the first and second input ports.

2. An optical device according to claim 1, wherein when a plurality of wavelengths are set as said allocated wavelength, said first and second states in said insertion section are set together for a plurality of allocated wavelengths.

3. An optical device according to claim 1, wherein when a plurality of wavelengths are set as said allocated wavelength, said first and second states in said insertion section are set independently for each of the allocated wavelengths.

4. An optical device which is capable of constructing a ring type optical transmission system by connecting to other optical devices which are each set with a different allocated wavelength, and which has a set allocated wavelength, said optical device comprising:

an optical transmitting section configured to output light of which wavelength is identical to said allocated wavelength; and an insertion section which comprises; a branching device which branches the input light into light of said allocated wavelength and light of wavelength except for said allocated wavelength, an optical switch configured to have a first input port which receives the light of said allocated wavelength branched by said branching device, a second input port which recieves and the light from said optical transmission section, and an output port which alternatively outputs, by switching, either the input light to the first input port or the input light to the second input port, and a multiplexer device which multiplexes the light of wavelength except for said allocated wavelength as branched by said branching device, and the output light from the output port of said optical switch.

5. A ring type optical transmission system comprising:
a plurality of optical devices, each set with a different allocated wavelength, and comprising; an optical transmitting section which outputs light of said allocated wavelength, and an insertion section which has; a first state in which light of said allocated wavelength in the input light is blocked, while light of said allocated wavelength input from said optical transmitting section, and light in the input light which is not of said allocated wavelength is output, and a second state in which the input light is output, while light of said allocated wavelength input from said optical transmitting section is blocked;
a central device which is capable of blocking light of a specific wavelength in the input light, while outputting light of said specific wavelength, where said specific wavelength corresponds to at least one of the allocated wavelengths in said plurality of optical devices; and
a ring transmission path to which said plurality of optical devices and at least one of said central device are connected;
wherein the insertion section comprises:
an optical filter including at least four ports; and
an optical switch including two input ports and an output port;
wherein:
said optical filter includes a first port that receives the input light, a second port that outputs light component of said allocated wavelength out of the input light, a third port that receives an output light from the Output port of said optical switch, and a fourth port that outputs a multiplexed light which is obtained by multiplexing light component of wavelength other than said allocated wavelength out of the input light with light inputted to the third port, and
said optical switch includes a first input port that receives the output light from the second port of said optical filter, a second input port that receives the light outputted by said optical transmitting section, and the output port that is switchably connected to one of the first and second input ports.

6. A ring type optical transmission system according to claim 5, wherein
when said central device outputs an optical signal to all of said plurality of optical devices by means of light of said specific wavelength,
an optical device having an allocated wavelength corresponding to said specific wavelength of said central device is set to said second state.

7. A ring type optical transmission system according to claim 5, wherein for said plurality of optical devices and said central device, each of the settings are controlled in a synchronized manner according to control signals applied from a network management system which manages the communication status of the entire system.

8. A ring type optical transmission system according to claim 5, wherein said central device comprises: an optical transmitting section which outputs light of said specific wavelength; a first wavelength selective switch which branches input light from said ring transmission path and extracts light of said specific wavelength; and a second wavelength selective switch which multiplexes light in said input light which is not of said specific wavelength with output light from said optical transmitting section, and outputs to said ring transmission path.

9. A ring type optical transmission system according to claim 8, wherein said central device comprises an optical coupler which branches input light from said ring transmission path into two, and one of the lights branched by said optical coupler is applied to said first wavelength selective switch, and the other light is applied to said second wavelength selective switch.

10. A ring type optical transmission system comprising:
a plurality of first ring optical devices connected to a first ring transmission path, and each set with a different allocated wavelength, and comprising; an optical transmitting section which outputs light of said allocated wavelength, and an insertion section which has; a first state in which light of said allocated wavelength in the input light is blocked, while light of said allocated wavelength input from said optical transmitting section, and light in the input light which is not of said allocated wavelength is output, and a second state in which the input light is output, while light of said allocated wavelength input from said optical transmitting section is blocked;
a plurality of second ring optical devices connected to a second ring transmission path, and each set with a different allocated wavelength, and comprising; an optical transmitting section which outputs light of said allocated wavelength, and an insertion section which has; a first state in which light of said allocated wavelength in the input light is blocked, while light of said allocated wavelength input from said optical transmitting section, and light in the input light which is not of said allocated wavelength is output, and a second state in which the input light is output, while light of said allocated wavelength input from said optical transmitting section is blocked;
a switching device connected to said first and second ring transmission paths, and which is capable of switching between a first state in which said first and second ring transmission paths are connected to each other, and a second state in which said first and second ring transmission paths are closed and independent;
wherein the insertion section comprises:
an optical filter including at least four ports; and
an optical switch including two input ports and an output port;
wherein:
said optical filter includes a first port that receives the input light, a second port that outputs light component of said allocated wavelength out of the input light, a third port that receives an output light from the output port of said optical switch, and a fourth port that outputs a multiplexed light which is obtained by multiplexing light component of wavelength other than said allocated wavelength out of the input light with light inputted to the third port, and
said optical switch includes a first input port that receives the output light from the second port of said optical filter, a second input port that receives the light outputted by said optical transmitting section, and the output port that is switchably connected to one of the first and second input ports.

11. A ring type optical transmission system according to claim 10, wherein when said first ring optical device outputs an optical signal to all of said plurality of second ring optical devices by means of light of a specific wavelength being said allocated wavelength, said second ring optical device for which said specific wavelength is said allocated wavelength is set to said second state.

12. A ring type optical transmission system according to claim 10, wherein for said plurality of first ring optical devices, said plurality of second ring optical devices, and said switching device, each of settings are controlled in a synchronized manner according to control signals applied from a network management system which manages the communication status of the entire system.

13. A ring type optical transmission system according to claim 10, wherein said switching device comprises:

a first wavelength selective switch which branches input light from said first ring transmission path and extracts light sent to said second ring transmission path;

a second wavelength selective switch which branches input light from said second ring transmission path and extracts light sent to said first ring transmission path;

a third wavelength selective switch which multiplexes light in said input light from said first ring transmission path which is light other than light sent to said second ring transmission path with light extracted by said second wavelength selective switch, and outputs to said first ring transmission path; and a fourth wavelength selective switch which multiplexes light in said input light from said second ring transmission path which is light other than light sent to said first ring transmission path with light extracted by said first wavelength selective switch, and outputs to said second ring transmission path.

14. A ring type optical transmission system according to claim 13, wherein said switching device comprises:

a first optical coupler which branches input light from said first ring transmission path into two, and a second optical coupler which branches input light from said second ring transmission path into two, and one of the lights branched by said first optical coupler is applied to said first wavelength selective switch, and the other light is applied to said third wavelength selective switch, and one of the lights branched by said second optical coupler is applied to said second wavelength selective switch, and the other light is applied to said fourth wavelength selective switch.

* * * * *